United States Patent [19]

Lynch

[11] Patent Number: 4,974,548

[45] Date of Patent: Dec. 4, 1990

[54] ADJUSTABLE FEEDER FOR LIVESTOCK

[76] Inventor: Delmar J. Lynch, RR. 1, Box 86, Burbank, S. Dak. 57010

[21] Appl. No.: 366,598

[22] Filed: Jun. 15, 1989

[51] Int. Cl.⁵ ............................................. A01K 5/00
[52] U.S. Cl. ................................................. 119/56.1
[58] Field of Search .................. 119/56.1, 56.2, 57.91; 222/276, 284, 344

[56] References Cited

U.S. PATENT DOCUMENTS

| | | | |
|---|---|---|---|
| 284,301 | 9/1883 | Hester et al. | 119/56.1 X |
| 1,176,016 | 3/1916 | Anderson | 119/56.1 |
| 2,983,408 | 5/1961 | Schwartz | 222/284 |
| 3,800,746 | 4/1974 | Stidham | 119/56.1 |
| 3,907,166 | 9/1975 | Bassignani | 222/284 |
| 3,962,998 | 6/1976 | Lynch | 119/56.1 |

FOREIGN PATENT DOCUMENTS

| | | | |
|---|---|---|---|
| 1200055 | 9/1965 | Fed. Rep. of Germany | 119/52.1 |
| 2336875 | 7/1977 | France | 119/56.1 |
| 8303898 | 11/1983 | PCT Int'l Appl. | 222/284 |
| 0008723 | 6/1895 | United Kingdom | 222/284 |
| 0993293 | 5/1965 | United Kingdom | 119/56.1 |

Primary Examiner—Robert P. Swiatek
Assistant Examiner—Todd E. Manahan

[57] ABSTRACT

An improvement in livestock feeders of the type using sliding compartments to measure feed comprising comparatively thin vertical walls for the compartments. The improved device also uses multiple compartments of varying sizes whereby the amount of feed discharged can be variably measured. The thin walls prevent build up of feed on a floor on which they slide.

The device is operated manually by a lever in conjuction with a flat surface valve-type mechanism in the middle of the upper portion of each slide. Adjustment of the amount of feed delivered is accomplished by using blocking devices limiting the travel of that lever.

1 Claim, 2 Drawing Sheets 4,974,548

ADJUSTABLE FEEDER FOR LIVESTOCK

BACKGROUND AND SUMMARY OF THE INVENTION

This invention pertains to livestock feeders of a type adapted to place dry, ground feed into a trough where it can readily be reached by livestock, and represents an improvement on such a feeder as disclosed in my previous U.S. Pat. No. 3,962,998.

In that previous patent, I disclosed a feeder using a slide mechanism to drop a measured amount of feed into a trough in response to being moved from a filling position to a discharge position. The slide was moved from one position to another by a lever pivotted at its lower end, and extending upward to a handle and with means extending from the slide to the lower end attached to the lever intermediate between its end. In one position, a compartment in the slide was open to feed dropping by gravity from an upper bin, but was closed beneath. When slid to the discharge position, the opening from the upper bin was either cut off or was open to an alternate compartment, and the original compartment was opened at its lower end to discharge the material from the compartment into the trough.

The device of that invention worked reasonably well, but there were some shortcomings. Among those shortcomings was the fact that too often, there were bridge-overs within the sliding compartments. The sloping sides were not steep enough always to provide nearly complete dropping of the feed. Also, there was no possible adjustment in the amount of feed delivered while there was feed in the bin except by providing multiple drops. Thus, the user could measure by using two or three or four drops, but there was no way of measuring one-half of the amount of a single drop. Therefore, in order to use the device for more highly concentrated feeds or for the changing of the size of the feed compartments, it was necessary to remove the slide train to make the adjustment or to adjust by repeated movement of the slide. In order to remove the slide train, it was necessary to remove all the feed or to wait until the bins were empty. Another shortcoming of the previous device was the pivot point of the operating lever. That lever was pivotted very low on the device and frequently was in the mud, snow, and manure of the feed lot. In colder climates that led to occasional freezing of the device at the pivot so that it was difficult or impossible to operate. The lever was also subject to being bumped by livestock with consequent injury either to the livestock, the feeder or to both.

By my new invention, I provide a device in which the amount of feed delivered can be adjusted by varying the length of stroke of the operating lever. Also, the compartments have walls that are substantially vertical so that there is less likelihood of bridging. I also provide a somewhat more compact lever system for operating my device.

DESCRIPTION

Figure 2:
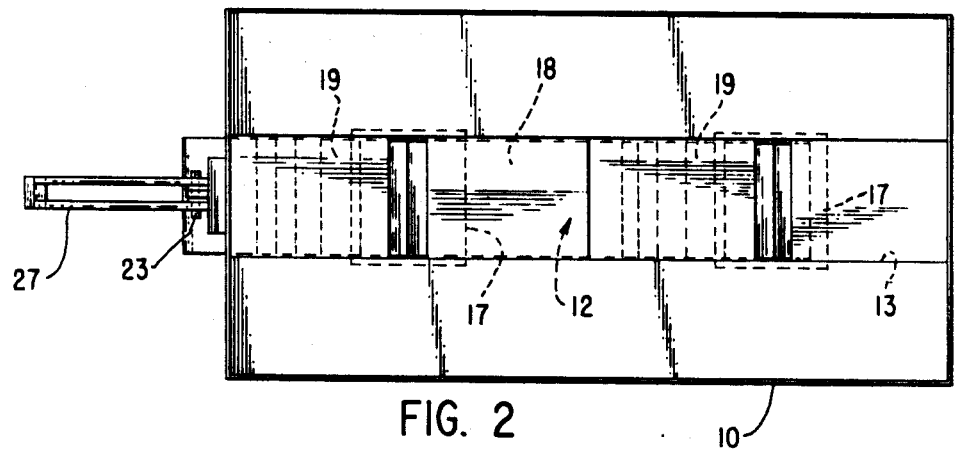
FIG. 2 is a top plan view of the feeder of FIG. 1.

Briefly my invention comprises an improvement of the device of my former patent. The improvements provide better feed delivery and an improved system of adjustment to provide more accurate feed proportions at all times.

More specifically and referring to the drawings, the new device, like the old, is adapted to be used in connection with a feed bin 10 having tapered chutes or hoppers 11 below and adapted to deliver a relatively narrow stream of feed. Also like the former system, a slide or train 12 is slidably disposed in a guideway 13. A lever 14 is also used to operate the slide. Feed from the train is also delivered to individual feed troughs 15.

Although there are many similarities in the broad configuration, the new device is considerably improved. The improvements as shown in the drawings include the use of fractional compartments 16 and 16' on the slide 12. In the previous device the slide compartments were provided with tapered sidewalls so that the outlet from the compartment could register fully with openings in the floor of the guideway. The new device retains the openings 17 formed in the floor 18 of the guideway 13 through which the feed drops into the troughs 15.

One of the important improvements of this device lies in the shape and sizes of the compartments 16 and 16'. In the old device the compartments were formed with tapered walls to allow the emptying of those compartments through narrow slots in the floor. That shape worked well with some types of feed. With other types, there could be considerable bridging over and compaction so that not all of the feed flowed from the compartment into the trough.

In the present device the walls of the compartments are vertical. Further, as will be seen in the figures, the compartments 16' are only half as wide as the compartments 16. Thus, by properly positioning the slide under the hoppers 11, I can provide selective filling of only the compartments 16, or with some small adjustment of the slide, the larger compartments 16 and an adjacent compartment 16' could be filled. Further sliding would open both of the smaller compartments 16' to be filled and the wider compartments 16 would also be filled. Thus, by proper positioning of the slide, the amount of feed delivered to the compartments can be controlled. By this control, the amount of feed delivered to the troughs 15 can readily be regulated.

Between adjacent groups of compartments, there is a feed support plate 19 mounted in the space between adjacent groups of compartments 16 and 16', and carried on the slide. This plate is proportioned so that when the slide is in a neutral position, the plate 19 completely covers the exit from the chutes 11. Although the plate 19 covers the exit in a neutral position, that position would not be ordinarily necessary in the operation of the feeder. As shown in the figures, I prefer to proportion this plate to have a width equal to the total of the opening to the two smaller compartments 16'. Also, I prefer to proportion the width of the floor 18 to equal the sum of the widths of all of one grouping of compartments 16 and 16' plus the width of the support plate 19.

Figure 4:
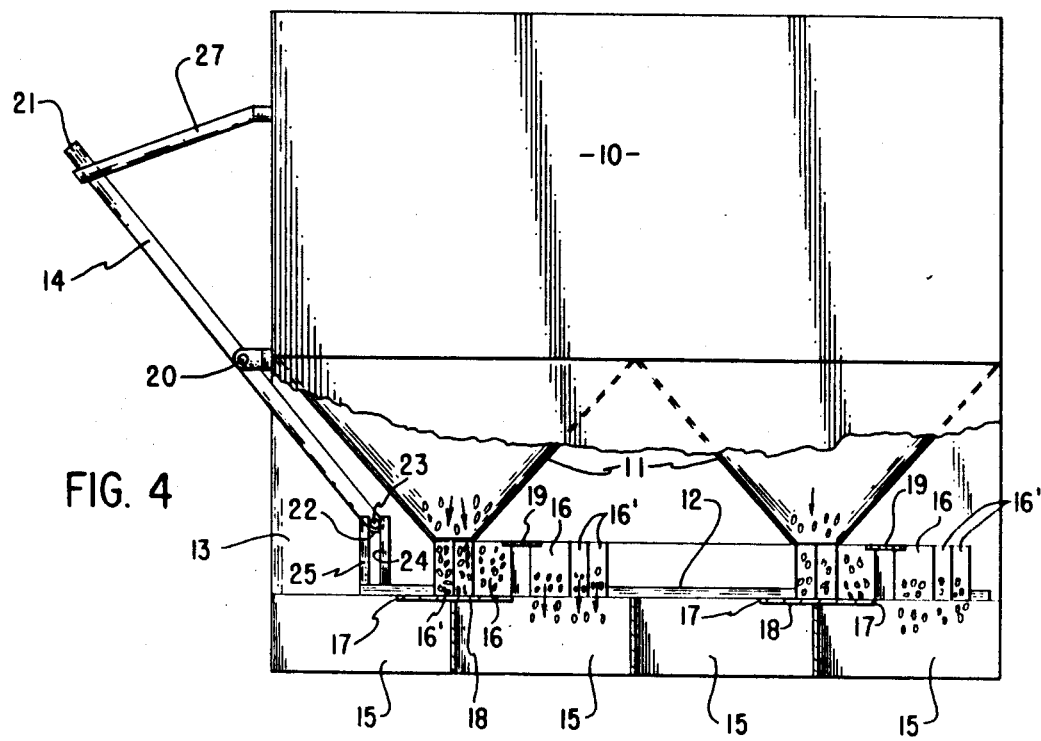
FIG. 4 is a side elevational view of the feeder with parts broken away to show the operation of the device.

Movement of the slide is controlled by a lever arrangement. In the former device, the lever was pivotally attached to the troughs at a point below the slide. In many instances the arrangement was unsatisfactory because the lower pivot was often covered by the dirt and manure of the feed lot or by snow and ice. In the present device, the lever 14 is pivotally attached to the feed bin at a bracket 20. The pivot axis on the bracket 20 is about midway between the handle end 21 and the slide end 22 (FIG. 4). At the slide end the lever carries a cross bar 23. This cross bar extends into the slots 24 of a slotted bracket 25 on the end of the slide 12. Thus, movement of the handle end 21 of the lever 14 will cause the slide to move under the chutes 11.

Figure 1:
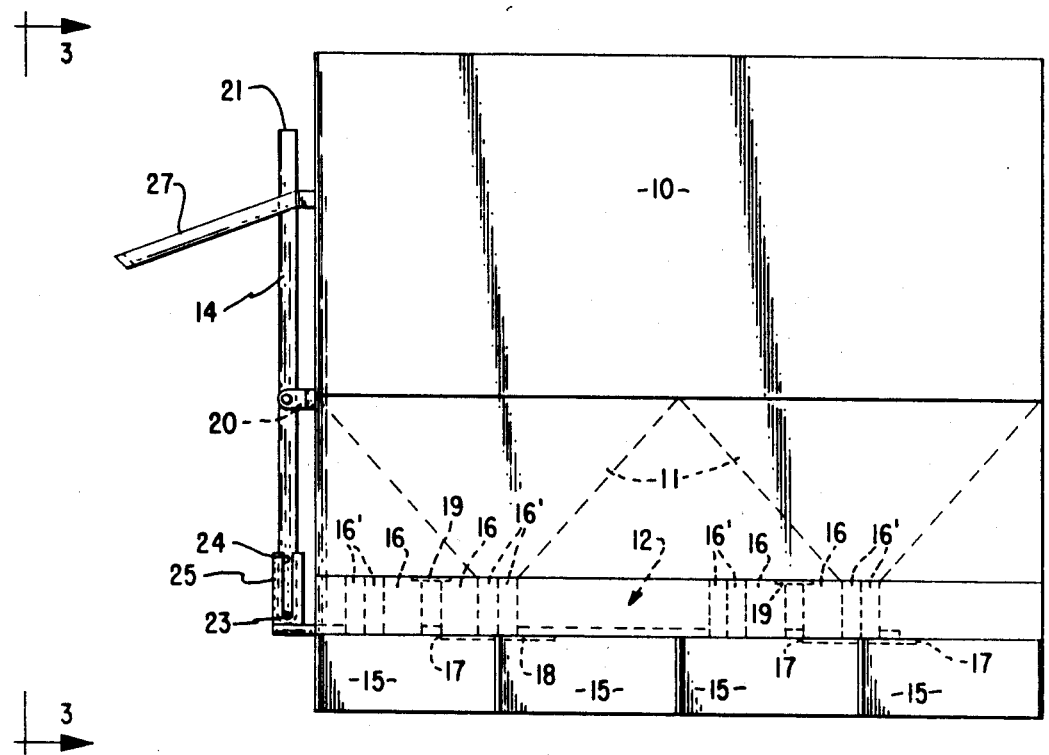
FIG. 1 is a side elevational view of a feeder embodying the device of my invention.
Figure 3:
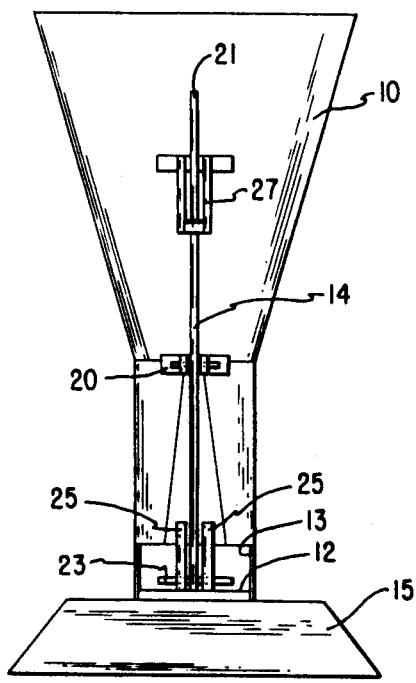
FIG. 3 is an end elevational view of the feeder from line 3—3 of FIG. 1.

The amount of movement of the lever 14 is controlled by use of a yoke 27 mounted on the side of the bin 10. The lever extends between the two arms of the yoke. The yoke is proportioned so that movement of the lever from a first position adjacent the bin wall (as shown in FIG. 1) to a position at which the lever is stopped by the end of the yoke (as shown in FIG. 4) moves the slide 12 from one limited position to the other under the chutes 11.

Figure 6:
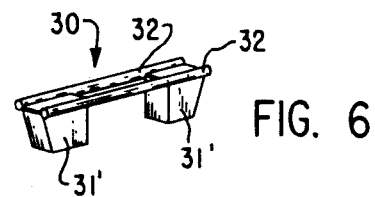
FIG. 6 is a view similar to FIG. 5 of an alternate stop control.
Figure 5:
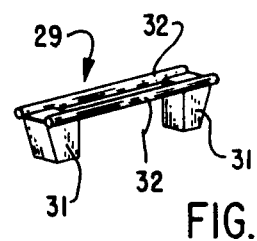
FIG. 5 is a perspective view of a dropped-in stop control adapted to limit the movement of the lower operating member.

To control the slide so that less than all of the slide compartments are filled, it is necessary only to limit the movement of the handle end 21 of the lever 14. In my preferred embodiment, this is done by using limit brackets 29 and 30 (FIGS. 5 and 6). The showing of two limit brackets 29 and 30 is not intended to limit the member. If finer adjustments or more adjustments were deemed necessary several more brackets might be used. The brackets 29 and 30 are formed with blocked bars 31 and 31' joined together by exterior bars 32. The blocks 31 amd 31' are narrow enough to fit between the sides of the yoke 27. Thus, when in place with the ends of the extension bars 32 resting on the sides of the yoke 27, the blocks 31 engage the end of the yoke 27 and the side of the bin 10. By proportioning the thickness of the block 31 properly, the movement of the lever can be limited so that only the proper compartments in the slide 12 will be filled. Therefore, the bracket 29 shown in FIG. 5 has blocks 31 somewhat thinner than the block 31' on the bracket 30 in FIG. 6. Therefore the use of bracket 30 will limit the movement of the lever to a somewhat more limited range of travel and thus limit the slide 12 movement so that only the desired compartments will be filled.

Thus, I have provided an improved, more readily adjustable mechanism for this type of feeder for controlled feeding of livestock.

I claim as my invention:

1. A livestock feeder comprising a bin for holding feed, sloped hoppers extending downward from said bin, said hoppers having open discharge ends at their lowest end, a guideway beneath said hoppers, slide means slidably engaged in said guideway and adapted to slide selectively beneath said discharge ends, said slide means having multiple compartments of various sizes adapted to be selectively filled with feed from said discharge ends, said guideway having a lower floor, said lower floor having openings formed therein through which said compartments will empty, said openings being displaced from said discharge ends so that the filling and emptying do not coincide in time, said compartments having vertical side walls to prevent bridging of said feed, lever means including a lever pivotally attached to said bin, said lever being operably connected to said slide means, and having a handle end remote from said slide means to control movement of said slide means, control means attached to said bin adjacent said handle end of said lever, said control means including a yoke mounted on said bin, said yoke including side members extending on each side of said lever, and means engageable with said yoke including side bars engageable with said side members of said yoke, and blocked ends between said bars, said blocked ends being adapted to fit between said side members of the yoke thereby restricting the movement of said lever.

* * * * *